United States Patent
Kim et al.

(10) Patent No.: US 8,099,220 B2
(45) Date of Patent: Jan. 17, 2012

(54) METHOD FOR ADAPTING SHIFT SCHEDULE OF AN AUTOMATIC TRANSMISSION BASED ON GPS/MAP INFORMATION

(75) Inventors: Daekyun Kim, Rochester Hills, MI (US); Kumaraswamy V. Hebbale, Troy, MI (US); Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 768 days.

(21) Appl. No.: 12/181,632

(22) Filed: Jul. 29, 2008

(65) Prior Publication Data
US 2010/0030437 A1 Feb. 4, 2010

(51) Int. Cl.
*G06F 7/00* (2006.01)
(52) U.S. Cl. ............... 701/65; 701/51; 701/54; 701/64; 701/87; 701/95; 477/97

(58) Field of Classification Search .................... 701/51, 701/54, 56, 64–65, 79, 84, 87, 95; 477/97
See application file for complete search history.

(56) References Cited

U.S. PATENT DOCUMENTS

| | | | |
|---|---|---|---|
| 5,716,301 A | 2/1998 | Wild et al. | |
| 5,832,400 A | 11/1998 | Takahashi et al. | |
| 2002/0049116 A1* | 4/2002 | Shiiba et al. | 477/97 |

FOREIGN PATENT DOCUMENTS

| | | |
|---|---|---|
| JP | 2000074199 A | 3/2000 |
| JP | 2002-122229 A2 | 4/2002 |
| JP | 2002-122231 A2 | 4/2002 |
| JP | 2002106713 A | 4/2002 |
| JP | 2006096335 A | 4/2006 |

* cited by examiner

*Primary Examiner* — Gertrude Arthur Jeanglaude

(57) ABSTRACT

A powertrain control includes monitoring map preview information, determining a road gradient factor based upon the map preview information, and adapting a transmission shift schedule based upon the road gradient factor.

28 Claims, 5 Drawing Sheets

METHOD FOR ADAPTING SHIFT SCHEDULE OF AN AUTOMATIC TRANSMISSION BASED ON GPS/MAP INFORMATION

TECHNICAL FIELD

This disclosure is related to transmission control in a motor vehicle.

BACKGROUND

The statements in this section merely provide background information related to the present disclosure and may not constitute prior art.

Transmissions are devices well known in the art comprising means to convert torque from one or more spinning shafts into torque on one or more spinning shafts. Transmissions can redirect torque in multiple directions depending upon the transmission configuration. Transmissions can reverse shaft spinning direction, and transmissions can include a gear reduction factor, transforming one shaft speed and torque to another shaft speed and torque by means well known in the art. Transmissions can utilize discrete gear states to accomplish the various torque transmission and conversion functions required. Such transmissions use clutches, brakes or other torque transfer devices (hereafter clutches) to engage and disengage various transmission members in order to shift between gear states. Transmission shifts usually include a disengagement of a first clutch, interrupting the torque delivered through the transmission, and then an engagement of a second clutch, reestablishing the torque delivered through the transmission.

Through transmission shifts, an input torque and shaft speed fixed within a certain range can perform a wide variety of functions. For instance, in a motor vehicle comprising an internal combustion engine, the engine supplies a torque and a shaft speed within a certain range of engine operation. A transmission in a low gear with a high gear reduction ratio can be utilized to launch a vehicle from a stopped position, with the engine shaft speed being reduced by the high gear ratio to an output shaft with a lower shaft speed. However, in the conversion, the torque of the output shaft is significantly higher than the torque of the engine shaft, facilitating a high propelling force needed to move an initially stopped vehicle. As the vehicle begins to move, the output shaft, coupled to the wheels of the vehicle, gains speed. The engine connected through the transmission to the output shaft at a fixed gear ratio can only impart so much speed to the output shaft at the low gear ratio, but by shifting gear state within the transmission to a gear state with a lower gear reduction ratio, the engine shaft can continue to accelerate the output shaft to greater speeds. One having ordinary skill in the art will appreciate that such transmission shifts can be used to up shift and down shift, accomplishing a wide variety of driving functions.

Additionally, a vehicle with a hybrid drive powertrain, comprising two or more potential sources of input torque, for instance an engine and an electric machine receiving energy from an energy storage device such as a battery, can utilize a transmission to transmit torque in various directions between the various components of the hybrid drive powertrain. For instance, an electric machine can operate to receive torque from the transmission to provide energy to the energy storage device, may also impart torque to the transmission to assist in propelling the vehicle.

Transmission shifts are necessary to accomplish the intended functions of the transmission, changing from one gear state to another in order to transmit torque as required. However, as described above, transmission shifts may include an interruption to the torque provided through the transmission. Such an interruption of torque creates an interruption in the function being served by the torque. In a motor vehicle, wherein the output torque can be used to propel or accelerate the vehicle, an interruption to the torque in the output shaft may result in a rapid and perceptible change in acceleration or jerk. Such interruptions in torque and the accompanying changes in acceleration may result in undesirable drivability. Additionally, the engine continues to turn through the interruption in torque, thereby consuming fuel without producing any output torque, and there are additional efficiency losses resulting from a transmission shift associated with engaging and disengaging associated clutches, both resulting in lower overall fuel efficiency for the vehicle.

While transmission shifts are often necessary based upon operation of the vehicle, circumstances can sometimes arise where a transmission shift, may be unnecessary. One instance impacting the necessity of transmission shifts includes an upcoming slowing of the vehicle by the operator.

Electronic means of tracking vehicle position and coordinating vehicle position with geographic, road, traffic, or other information are known in the art. Exemplary accessible electronic means to accomplish such data acquisition includes global position systems (GPS) in coordination with electronic maps, digital map software using means to track the movement of the vehicle, Internet-based wireless-accessible data processing, vehicle to vehicle communications, and vehicle to infrastructure communications and other remote computing resources. Information from such means include, for example: road classification, such as highway, local road, parking lot, gravel road, etc.; speed limits for various stretches of road; traffic conditions for various stretches of road, including real-time evaluations of congestion, signals sent from cooperating vehicles experiencing traffic, analysis of cellular phone patterns in other cars, and predictions based upon likely rush hour traffic or sporting event traffic; road slopes; road curvature; location and status of traffic lights, signals, construction zone markers, speed bumps, or other traffic direction indicators impacting vehicular travel; existence or lack of features likely to impact travel along a certain stretch of road, such as exit ramps or truck weigh stations; and analysis of vehicle or specific operator driving patterns, habits, registered schedules, electronic planner calendars, or other predictive measures. Additionally, likely routes of travel can be estimated based upon, for example, operator entered destinations, computerized analysis of driver habits and patterns.

SUMMARY

A powertrain of a vehicle includes an electromechanical transmission, having selectively operable clutches engaging torque from the engine to a drivetrain through a plurality of selectable gear states according to a transmission shift schedule. A powertrain control includes monitoring map preview information, determining a road gradient factor based upon the map preview information, and adapting the transmission shift schedule based upon the road gradient factor.

BRIEF DESCRIPTION OF THE DRAWINGS

One or more embodiments will now be described, by way of example, with reference to the accompanying drawings, in which:

FIG. 6 depicts graphical data from a test utilizing a shift schedule based on transmission sensors only, in accordance with the present disclosure;

FIG. 7 depicts graphical data from a test comparing different shift schedules, in accordance with the present disclosure;

DETAILED DESCRIPTION

Figure 1:
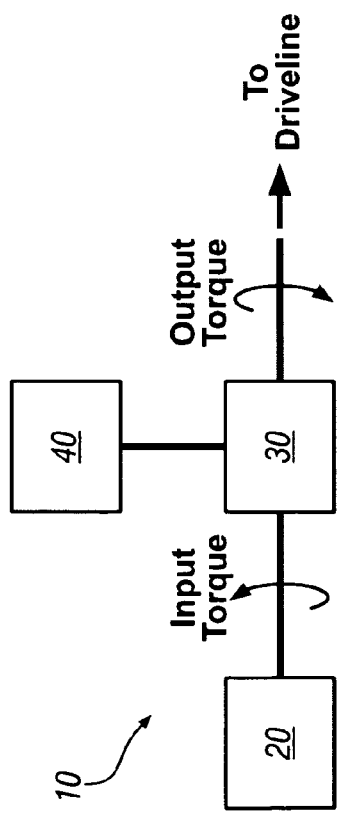
FIG. 1 schematically depicts an exemplary vehicular powertrain, illustrating a relationship between input torque and output torque applied through a transmission, in accordance with the present disclosure.

Referring now to the drawings, wherein the showings are for the purpose of illustrating certain exemplary embodiments only and not for the purpose of limiting the same, FIG. 1 schematically depicts an exemplary vehicular powertrain, illustrating a relationship between input torque and output torque applied through a transmission, in accordance with the present disclosure. Vehicle 10 comprises an engine 20, a transmission 30, and a transmission control module 40. Under normal operation, including vehicle acceleration, steady state operation, or gradual deceleration, the engine 20 supplies an input torque to the transmission 30, and transmission 30 converts the input torque, through a gear ratio internal to the transmission and, in an automatic transmission, subject to losses associated with operation of a torque converter, into an output torque, powering the driveline of vehicle 10. Under engine braking operation, wherein the vehicle speed is controlled by the operation of the engine counteracting high output torque being transferred from the driveline, output torque is converted through transmission 30 as an input torque to engine 20, and frictional and pumping forces within the engine resist or provide back-torque against the output torque, thereby slowing the vehicle. In either vehicle operation described above, the engine provides torque required to meet a torque demand in relation to the output torque. Under a majority of operating conditions, the engine is being used to power the driveline, so while engine braking operation is contemplated as a potential engine operation, the disclosure will discuss generally the engine operating to provide power to the driveline. Transmission control module 40 monitors operation of transmission 30 and other inputs from vehicle 10 and issues transmission shift commands to transmission 30 in order to effect transmission shifts.

The effect of output torque upon the driveline is a function of the operational conditions of the vehicle and the road environment on which the vehicle is operating. The magnitude of the output torque determines the magnitude of a propelling force upon the vehicle. As will be appreciated by one having ordinary skill in the art, the velocity and acceleration of an object are a result of the summation of forces acting upon the object. An object with balanced forces will not experience acceleration (including deceleration, or acceleration in a negative direction). An object with unbalanced forces will accelerate in the direction dictated by the larger force. In addition to propelling force applied by the output torque, a number of other forces act upon a vehicle, including gravitational force, drag force, and frictional forces.

In accordance with the present disclosure, a method is utilized to predict vehicle travel including the vehicle's route and speed through the route, and in combination with other factors, for instance road curvature or traffic light status, a prediction can be made regarding preferred gear state settings within the transmission through the route. These preferred gear state predictions can be used to evaluate changes commanded of the transmission by normal transmission control strategies throughout the route and modifying those commanded changes based upon the predictions. Such a prediction of preferred gear states can be made statically, for instance, by determining a maximum severity of an upcoming curve in the road and reacting by estimating a preferred gear state for the vehicle through that curve. Additionally, such a prediction can be made in real-time, for instance, if an otherwise unremarkable route changes to indicate congested traffic ahead likely to force a vehicle slow-down. In such an instance, preference can be indicated to maintain the current gear state in response to the perceived congested traffic instead of performing an up shift according to commands driven by transmission sensors. Also, such a prediction can be made on the basis of probabilities, for example, a traffic light in a busy area can be monitored on the basis of other cooperating vehicles on the same road. In this example, if other vehicles reporting route data show that the light being approached has been green for a long time, the odds of an upcoming stop increase. As described above in relation to an expected stop, a factor can be tabulated utilizing the probability that the light signal being approached is about to turn red, and a transmission shift schedule can be adapted based upon that factor. In this way, information regarding the surroundings of the vehicle can be utilized to preferentially modify the execution of transmission shifts.

GPS location and digital map technology provide for accurate estimation of vehicle location with respect to road geometry. Additionally, digital maps are available with accurate details regarding road geometry, such as road curvature and road slope. As a result, vehicles equipped with such electronic means can include algorithms to analyze road curvature and road slope to generate a road gradient factor. In the context of an algorithm useful to adapt transmission shift commands and as described above in terms of unnecessary up shifts in a vehicle about to slow down, this road gradient factor can take many embodiments, quantifying the degree to which a road through a length, environmental factors such as weather or time of day indicating ambient light levels, road surface, etc. One embodiment includes determining a maximum curvature of the road through a window of route analysis, for example a fixed distance in front of the vehicle or based upon a look ahead time of travel. One embodiment rates curvature through an algorithm as an integer value road gradient factor, with positive values indicating a turn to the left and negative values indicating a turn to the right, and wherein greater magnitudes of integers correspond to more drastic turns in the road. The road gradient factor generated in this exemplary embodiment can be utilized to adapt a transmission shift schedule, limiting up shifts based upon the magnitude of the integer value, in anticipation of the vehicle slowing to navigate the curved road or requiring acceleration torque through the curve.

The road curvature or any other relevant factor describing likely upcoming road conditions can be analyzed as described above through a window of analysis. As an alternative, and depending upon how many details are available regarding the predicted route of the vehicle, shift scheduling may be planned or modified throughout the route based upon GPS and map data available for the route. Predicted routes can be estimated or determined, for example, by analyzing past driving patterns or designated destinations by the operator.

Another embodiment includes determining a maximum slope of the road through a window of route analysis. Either an uphill or downhill slope in excess of a certain thresholds is likely to inhibit higher speed demands by the operator. An uphill slope and the effect of the weight of the vehicle on the slope make acceleration difficult. Additionally, additional torque required to maintain vehicle speeds on an uphill slope frequently create a transmission command to a lower gear. For either of these reasons, shifting to a higher gear at the approach of a substantial uphill slope may be desirable. Conversely, an operator frequently does not want an excessive increase in speed when traveling on a substantial downhill slope. Methods are known in the art to utilize lower gear settings to effect engine braking to maintain speed or reduce acceleration of the vehicle despite a downhill slope. Shifting to a higher gear at the approach of a substantial downhill slope may reduce engine braking and may not be desirable. One embodiment rates road slope through an algorithm as an integer value road gradient factor, with positive values indicating an uphill slope and negative values indicating a downhill slope, and wherein greater magnitudes of integers correspond to greater road grades. The road gradient factor generated in this exemplary embodiment can be utilized to adapt transmission shift schedules, limiting up shifts based upon the magnitude of the integer value, in anticipation of the vehicle slowing to navigate the curved road. The road gradient factor positive and negative integers may be applied similarly, reacting only to the magnitude of the integer. Alternatively, different thresholds or criteria can be used to judge positive and negative values differently, reflecting differences in the ways that a vehicle reacts to uphill and downhill slopes. Alternatively, the integer values can be determined under different criteria, for instance with a 2% uphill grade being designated a plus two and with a 2% downhill grade being designated a minus five. The road gradient factor determined as a result of road slope can be used to forestall a shift to a higher gear in isolation this way. Alternatively, the road gradient factor can be used in combination with a more complex algorithm projecting the eventual gear selection in the upcoming slope and prepare the vehicle in advance for that gear selection. Alternatively, road slope and road curvature can be utilized in unison, with a mild slope and a mild curve combining to create a more significant road gradient factor. While these exemplary embodiments, utilizing road curvature and road slope, are given to explain how GPS location and digital map technology can be used to accomplish the transmission shift override function described herein, the disclosure is not intended to be limited to these particular embodiments.

The methods described above utilize integer values to describe the road ahead of the vehicle. The exemplary use of descriptions utilizing integers has a benefit of simplicity in using these descriptive values in the control of the transmission. However, it will be appreciated by one having ordinary skill in the art that scalar, decimal numbers can be used with similar or equivalent effect.

Figure 2:
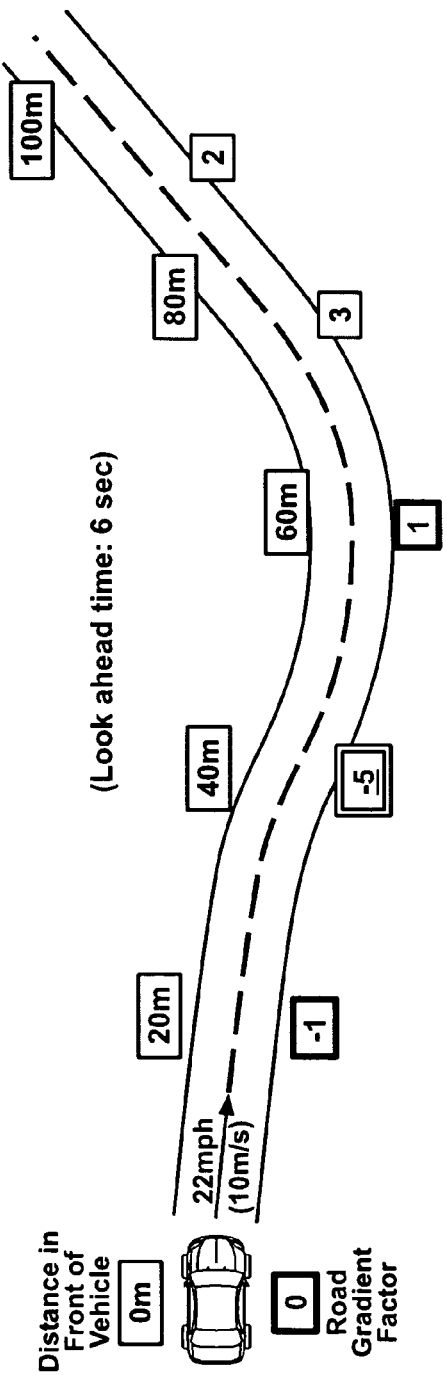
FIG. 2 depicts an exemplary vehicle positioned on a road, along with an exemplary analysis of the road developing a road gradient factor with respect to a road curvature, in accordance with the present disclosure.

FIG. 2 depicts an exemplary vehicle positioned on a road, along with an exemplary analysis of the road developing a road gradient factor with respect to a road curvature, in accordance with the present disclosure. A planned travel route is defined according to a selected parameter defining the window of route analysis; in this example, a look ahead time of six seconds is defined. Because the illustrated vehicle is traveling at ten meters per second, the road will therefore be analyzed to a distance of sixty meters in front of the vehicle. In the present exemplary embodiment, a road gradient factor is created describing an instantaneous maximum curvature in the road. In such an embodiment, the window of route analysis is important to creating the desired performance in the transmission shift schedule. For example, such an instantaneous analysis utilizes a window of route analysis creating a road analysis far enough in front of the vehicle to be predictive and, therefore, useful in describing the operation of the vehicle through some pending travel. However, the window of route analysis is not so far ahead of the vehicle as to unnecessarily restrict vehicle operation in anticipation of some distant road condition. Defining such a window of route analysis preferably involves a balancing of the negatives associated with performing an up shift and then a subsequent slowing versus the loss of efficiency and drivability incurred by delaying the up shift through the window of route analysis. In an embodiment of road analysis not utilizing an instantaneous maximum such as the above described embodiment, some weighting or filtering method can alternatively be utilized to reduce the effect upon a shift schedule of remote or distant road conditions. Returning to FIG. 2, a road gradient factor of minus five defines the instantaneous maximum curvature factor within the sixty meter route being analyzed and is therefore utilized to modify the shift schedule according to the methods described herein.

Figure 3:
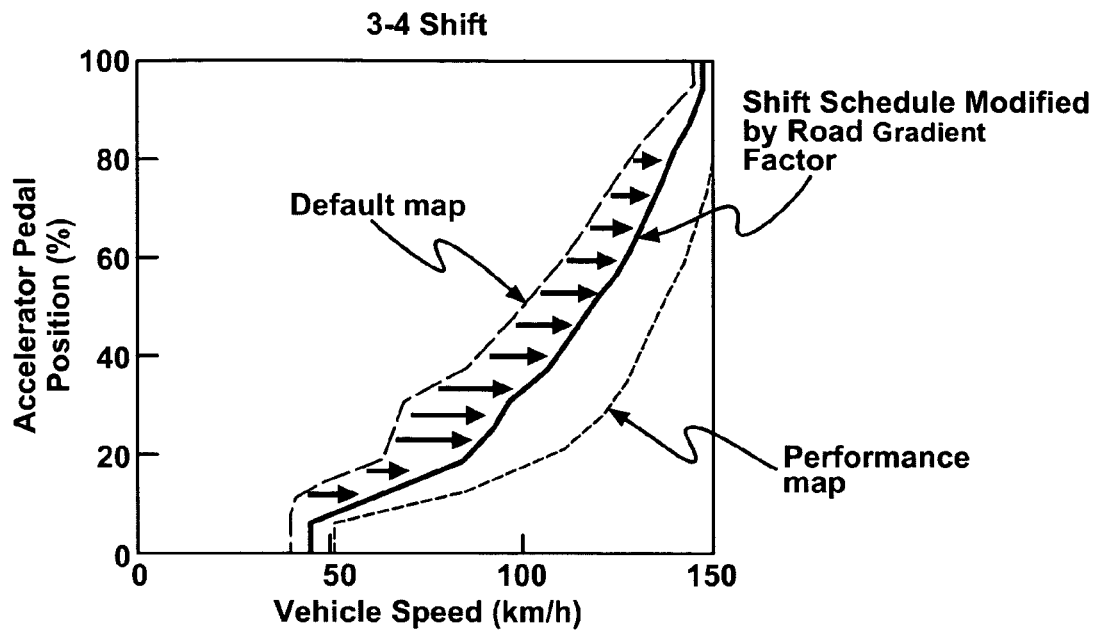
FIG. 3 is a graphical representation of an exemplary shift schedule of a vehicle, in accordance with the present disclosure.

FIG. 3 is a graphical representation of an exemplary shift schedule of a vehicle, in accordance with the present disclosure. The data describes operation of a vehicle within a speed range as depicted by the horizontal axis, and includes a gear state selection between third and fourth gears as selected by a vehicle operator pedal position, indicated on the vertical axis. While vehicle speed and pedal position are selected as determinative factors in the exemplary shift schedule illustrated in FIG. 3, it will be appreciated that different methods to quantify the selection of a particular gear state can be selected and depend upon the particular application. As is represented by the lines indicating default map and performance map, shift schedules are known to be modified by methods not described herein in order to effect different vehicle performance characteristics. The default map represents a shift schedule selected according to a set of operational priorities, for example, maximizing fuel efficiency and emissions control. The performance map represents a shift schedule selected according to a different set of operational priorities, for example, maximizing the propelling force resulting from the output torque. As described above in relation to launching a vehicle, the gear ratio utilized between the engine and the driveline defines the relationship of the input torque applied by the engine to the output torque provided to the driveline. A higher gear reduction ratio provides greater resulting torque to the driveline for a given engine speed, but conversely a higher engine speed for a given vehicle speed generally consumes more fuel. As illustrated by the resulting modified shift schedule depicted in FIG. 3, the method described herein adapts the shift schedule, delaying the initiation of a shift at any given pedal position by some permissible vehicle speed increase, thereby avoiding some range of transmission shifts which would occur for any given foot pedal position. The amount of delay of initiation of the shift can take many embodiments, and the amount can be scaled according to the road gradient factor, can be a stepped implementation depending upon the road gradient factor meeting some threshold level or levels, or can be effected through an algorithm, taking into account a number of factors including road gradient factor and, for instance, operator habits for turns of such magnitude at such vehicle speeds or the operator habits of that particular operator at that particular curve. Utilized according to this method, a shift schedule modified by a road gradient factor can be used to override normally commanded transmission shifts in response to perceived vehicle operating conditions, in particular, the presence of an upcoming curve in the road.

Figure 4:
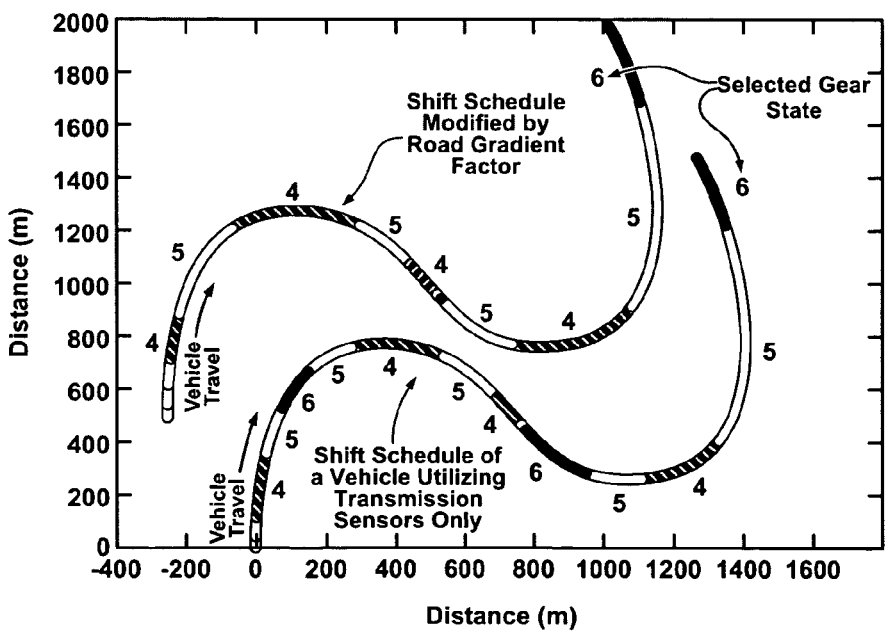
FIG. 4 graphically describes a computer simulation run, comparing shift events in an exemplary vehicle, including a shift schedule based on transmission sensors only and a shift schedule modified by a road gradient factor, in accordance with the present disclosure.

FIG. 4 graphically describes a computer simulation run, comparing shift events in an exemplary vehicle, including a shift schedule based on transmission sensors only and a shift schedule modified by a road gradient factor, in accordance with the present disclosure. The two data tracks illustrate a vehicle traveling on a spatial grid along the same theoretical road, and the numbers depicted next to each track illustrate gear state selected according to the two shift schedules. The data track representing the vehicle utilizing a shift schedule based on transmission sensors only traverses the route, traveling through thirteen gear states through the route. The data track representing the vehicle utilizing a shift schedule modified by a road gradient factor, with vehicle velocities corresponding to velocities of the first data track, traverses the route, traveling through only nine gear states through the route. Gear state selection efficiency can best be illustrated between the two data tracks by reviewing the two instances in which the unmodified track indicated a shift into sixth gear heading into a curve. In both instances, transmission sensor information, correlated to pedal position according to a shift schedule, commanded up shifts into sixth gear in two locations where the vehicle was about to enter a curve. By predicting vehicle operation through the curve by determining the road gradient factor, the vehicle in the track utilizing the modified shift schedule accomplished the route with fewer shifts.

Figure 5:
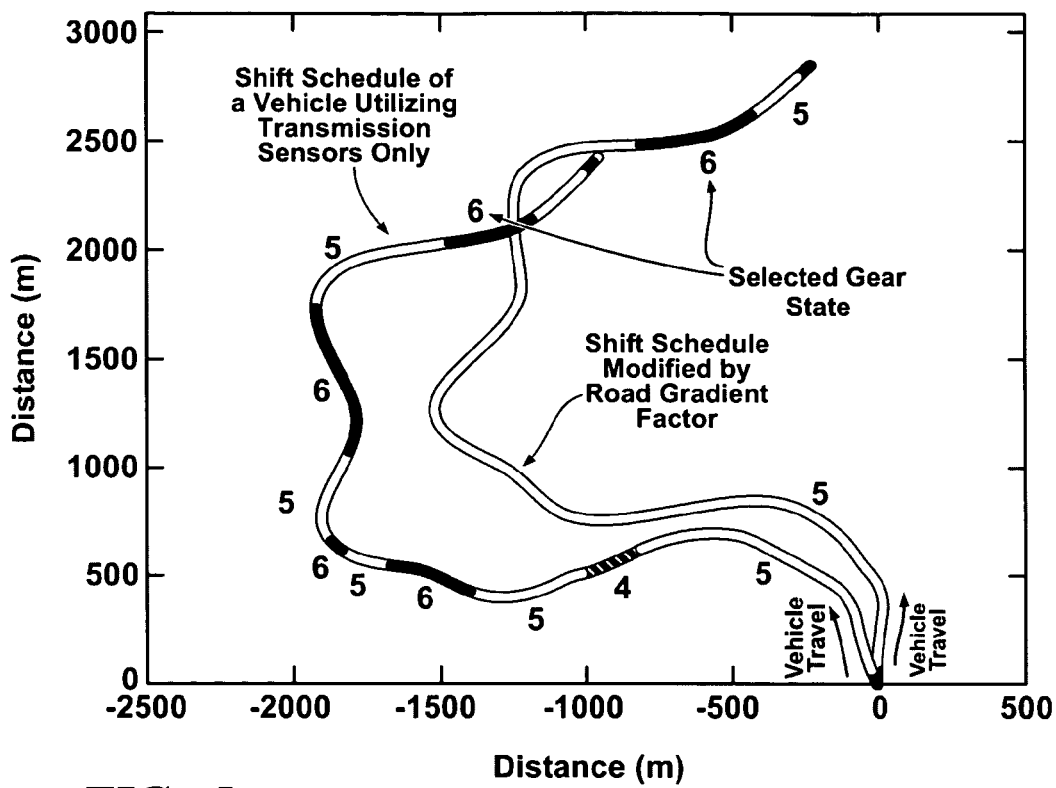
FIG. 5 graphically describes test data taken in an exemplary vehicle, comparing shift events executed by a shift schedule based on transmission sensors only and a shift schedule modified by a road gradient factor, in accordance with the present disclosure.
Figure 6:
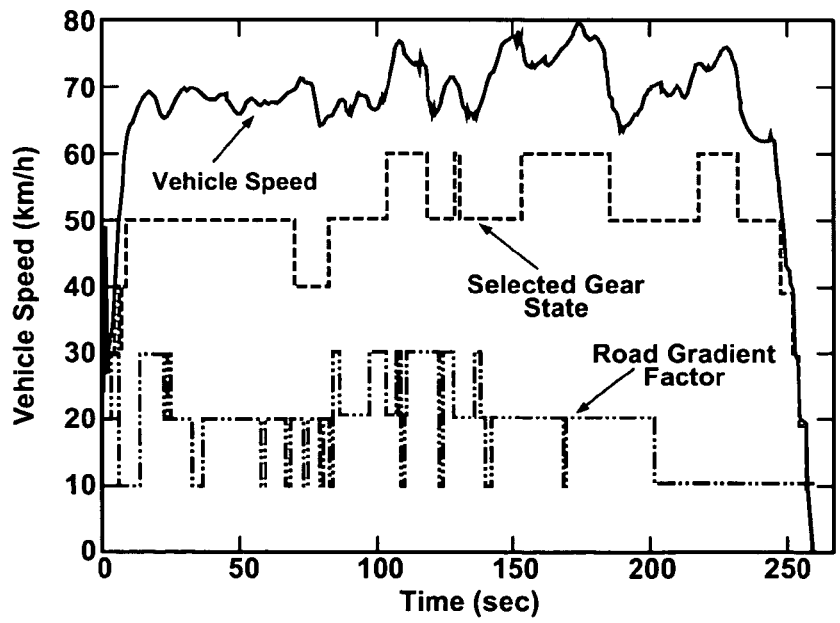
FIGS. 6 and 7 depict graphical data from the test illustrated in FIG. 5, in accordance with the present disclosure.
Figure 7:
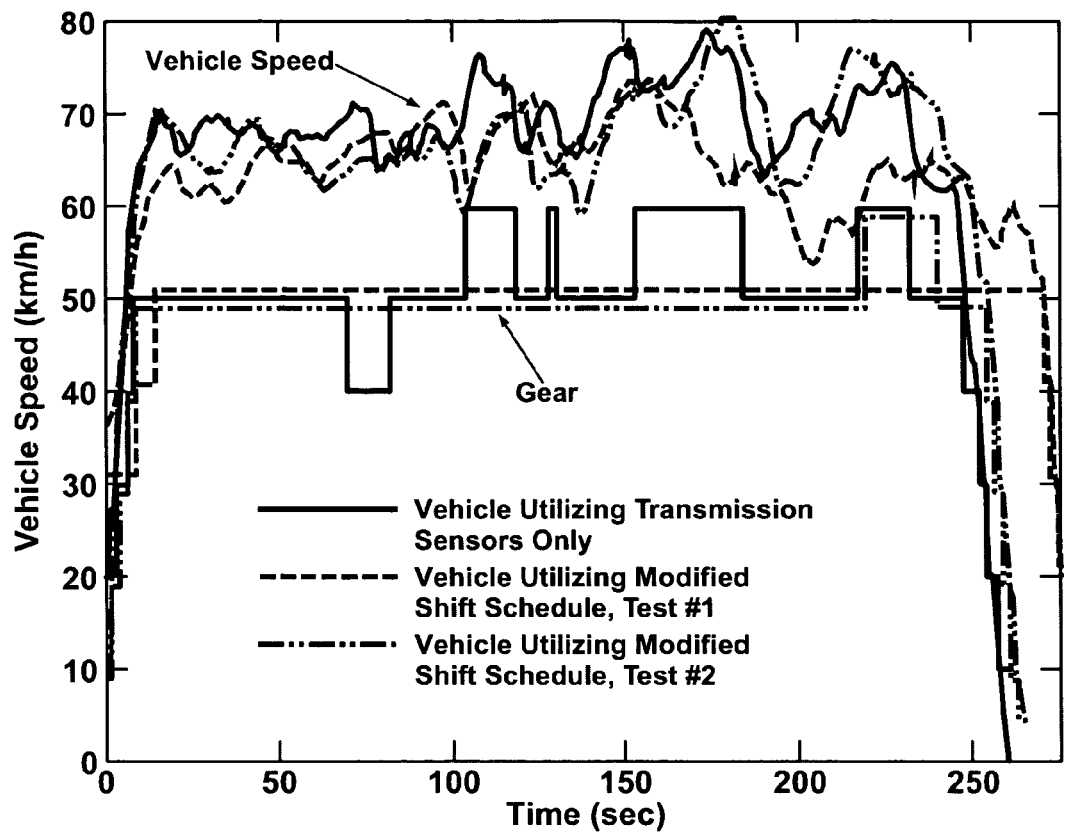

FIG. 5 graphically describes test data taken in an exemplary vehicle, comparing shift events executed by a shift schedule based on transmission sensors only and a shift schedule modified by a road gradient factor, in accordance with the present disclosure. The two data tracks illustrate a vehicle traveling on a spatial grid along the same actual road, and the numbers depicted next to each track illustrate gear state selected according to the two shift schedules. The depictions of the road in the two data tracks are offset upon the graph in order to allow comparison of the two tracks, and the data was taken physically on the same road during two otherwise identical test drives. As predicted by the simulation data depicted in FIG. 4, the test track representing the vehicle operated with a modified shift schedule accomplished the route with significantly fewer shifts than the vehicle utilizing transmission sensors only. FIGS. 6 and 7 depict graphical data from the test illustrated in FIG. 5. FIG. 6 depicts graphical data from a test utilizing a shift schedule based on transmission sensors only, in accordance with the present disclosure. FIG. 6 depicts data from the test including vehicle speed, gear state selected, and a determined road gradient factor. Vehicle speed and gear state are overlaid on a common time scale, demonstrating the operational state of the vehicle as it progressed along the road. The curvature factor includes the static determination of the instantaneous maximum curvature of the road within some window of route analysis and is substantially the same for all tests run on this road within this disclosure. FIG. 7 depicts graphical data from a test comparing different shift schedules, in accordance with the present disclosure. FIG. 7 depicts graphical data from both tests illustrated in FIG. 5 including vehicle speed and gear state selected and additionally depicts an additional test run utilizing a modified shift schedule. As described in FIG. 5 and confirmed by the additional test data, utilizing a modified shift schedule based upon a road gradient factor reduces the number of transmission shifts, in particular, associated with traveling along a route including curved roads.

Figure 8:
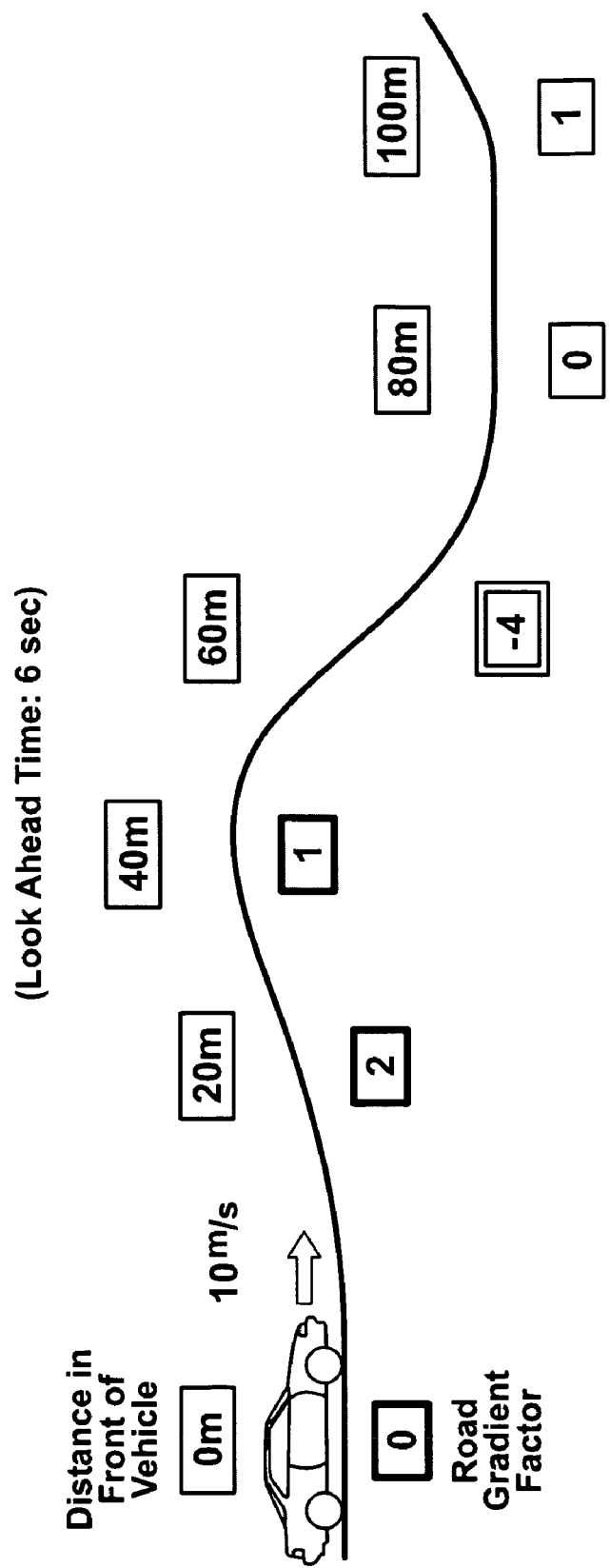
FIG. 8 depicts an exemplary vehicle positioned on a road, along with an exemplary analysis of the road developing a road gradient factor with respect to a road grade, in accordance with the present disclosure.

FIG. 8 depicts an exemplary vehicle positioned on a road, along with an exemplary analysis of the road developing a road gradient factor with respect to a road slope, in accordance with the present disclosure. A planned travel route is defined according to a selected parameter defining the window of route analysis; in this example, a look ahead time of six seconds is defined. Because the illustrated vehicle is traveling at ten meters per second, the road will therefore be analyzed to a distance of sixty meters in front of the vehicle. In the present exemplary embodiment, a road gradient factor is created describing an instantaneous maximum slope in the road within the window of route analysis. In the exemplary data of FIG. 8, a road gradient factor of minus four defines the instantaneous maximum road slope within the sixty meter route being analyzed and is therefore utilized to modify the shift schedule according to the methods described herein.

Figure 9:
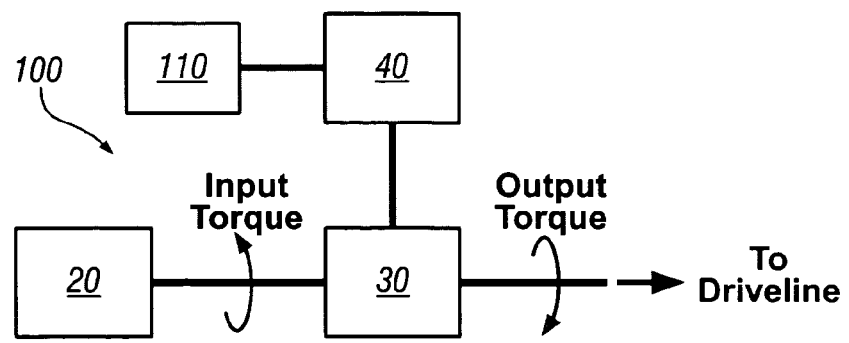
FIG. 9 schematically depicts an exemplary vehicular powertrain, illustrating torque applied through a transmission, including a control device implementing GPS/digital map technology, in accordance with the present disclosure.

FIG. 9 schematically depicts an exemplary vehicular powertrain, illustrating torque applied through a transmission, including a control device implementing GPS/digital map technology, in accordance with the present disclosure. Vehicle 100 comprises engine 20, transmission 30, transmission control module 40, and GPS/digital map device 110. Engine 20 provides input torque for the purpose of providing an output torque to the driveline (not shown). Transmission 30 operates as described above in various functions to transmit and manipulate said torque in order to provide propelling force to the driveline in gears and modes well known in the art. Transmission control module 40 is communicably connected to both transmission 30 and GPS/digital map device 110. By methods described herein, transmission control module 40 monitors inputs from transmission 30, GPS/digital map device 110, and other data from the vehicle, and module 40 issues transmission shift commands to transmission 30 in order to effect transmission shifts. This particular embodiment utilizes GPS/digital map device 110 to generate preview map information in order to determine a road gradient factor in accordance with the methods described herein. As will be appreciated by one having ordinary skill in the art and as described above, GPS location information is only one exemplary way to establish location of a vehicle, and the disclosure is not intended to be limited thereto. Additionally, GPS/digital map device 110 is illustrated in the exemplary embodiment of FIG. 9 is depicted as a stand-alone device. GPS/digital map device or a corresponding vehicle location device can be a unitary device, its functionality can be accomplished by a number of physical devices located in or in communication with the vehicle, for example, by a wireless communications network, or the device can be contained entirely within another device, such as the transmission control module.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method of operating a powertrain of a vehicle including an electromechanical transmission having selectively operable clutches engaging torque from an engine to a drivetrain through a plurality of selectable gear states according to a default transmission shift schedule, comprising:
    monitoring map preview information;
    determining a road gradient factor based upon said map preview information; and
    modifying said default transmission shift schedule based upon said road gradient factor.

2. The method of claim 1, wherein modifying said default transmission shift schedule based upon said road gradient factor includes overriding shift events to a higher gear when an impending vehicle slow down event is indicated.

3. The method of claim 1, wherein said road gradient factor comprises a numerical value describing an instantaneous maximum curvature through a window of route analysis.

4. The method of claim 3, wherein said road gradient factor is expressed as an integer value with a magnitude corresponding to said instantaneous maximum curvature through said window of route analysis.

5. The method of claim 3, wherein said window of route analysis comprises a distance in front of said vehicle.

6. The method of claim 3, wherein said window of route analysis comprises a look ahead time.

7. The method of claim 1, wherein said road gradient factor is determined through an algorithm evaluating the severity of at least one of an upcoming curve and an upcoming slope through a window of route analysis.

8. The method of claim 7, wherein said evaluating includes a weighting adjustment applied to said road gradient factor depending upon a distance to said at least one of an upcoming curve and an upcoming slope.

9. The method of claim 7, wherein said window of route analysis comprises a distance in front of said vehicle.

10. The method of claim 7, wherein said window of route analysis comprises a look ahead time.

11. The method of claim 1, wherein said road gradient factor comprises a numerical value describing an instantaneous maximum slope through a window of route analysis.

12. The method of claim 11, wherein said road gradient factor is expressed as an integer value with a magnitude corresponding to said instantaneous maximum slope through said window of route analysis.

13. The method of claim 11, wherein said window of route analysis comprises a distance in front of said vehicle.

14. The method of claim 11, wherein said window of route analysis comprises a look ahead time.

15. The method of claim 1, wherein said road gradient factor is determined through an algorithm evaluating the severity of an upcoming curve and an upcoming slope through a predicted route of travel.

16. The method of claim 15, wherein said predicted route of travel is determined by analyzing past driving patterns.

17. Method of operating a powertrain of a vehicle including an electromechanical transmission having selectively operable clutches engaging torque from an engine to a drivetrain through a plurality of selectable gear states according to a default transmission shift schedule, comprising:
    monitoring map preview information comprising GPS location data in coordination with a digital map through a window of route analysis;
    determining a road gradient factor based upon said map preview information; and
    modifying said default transmission shift schedule based upon said road gradient factor, wherein said modifying comprises increasing a vehicle speed required to indicate an up shift event for a particular foot pedal position.

18. The method of claim 17, wherein said road gradient factor comprises a numerical value describing an instantaneous maximum curvature.

19. The method of claim 17, wherein said road gradient factor comprises a numerical value describing an instantaneous maximum slope.

20. The method of claim 17, wherein said window of route analysis comprises a distance in front of said vehicle.

21. The method of claim 17, wherein said window of route analysis comprises a look ahead time.

22. Apparatus for operating a powertrain of a vehicle including an electromechanical transmission having selectively operable clutches engaging torque from an engine to a drivetrain through a plurality of selectable gear states according to a default transmission shift schedule, comprising:
    a vehicle location device programmed to determine vehicle location in relation to a digital map and to generate a road gradient factor based upon said vehicle location device and said digital map; and
    a transmission control module in communication with said vehicle location device and programmed to modify said default transmission shift schedule based upon said road gradient factor.

23. The apparatus of claim 22, wherein said road gradient factor comprises a numerical value describing an instantaneous maximum curvature through a window of route analysis.

24. The apparatus of claim 23, wherein said window of route analysis comprises a distance in front of said vehicle.

25. The apparatus of claim 23, wherein said window of route analysis comprises a look ahead time.

26. The apparatus of claim 22, wherein said road gradient factor comprises a numerical value describing an instantaneous maximum slope through a window of route analysis.

27. The apparatus of claim 26, wherein said window of route analysis comprises a distance in front of said vehicle.

28. The apparatus of claim 26, wherein said window of route analysis comprises a look ahead time.

* * * * *